United States Patent
Haintze et al.

(10) Patent No.: US 9,517,864 B2
(45) Date of Patent: Dec. 13, 2016

(54) CLOSURE WITH AN ELASTICALLY DEFORMABLE ELEMENT

(71) Applicant: AJH047 SP. Z O.O., Warsaw (PL)

(72) Inventors: Jerzy Haintze, Warsaw (PL); Andrzej Haintze, Warsaw (PL)

(73) Assignee: AJHO47 SP. ZO.O., Warsaw (PL)

( * ) Notice: Subject to any disclaimer, the term of this patent is extended or adjusted under 35 U.S.C. 154(b) by 0 days.

(21) Appl. No.: 14/905,678

(22) PCT Filed: Jul. 17, 2014

(86) PCT No.: PCT/PL2014/000082
§ 371 (c)(1),
(2) Date: Jan. 15, 2016

(87) PCT Pub. No.: WO2015/009179
PCT Pub. Date: Jan. 22, 2015

(65) Prior Publication Data
US 2016/0159529 A1    Jun. 9, 2016

(30) Foreign Application Priority Data

Jul. 18, 2013 (PL) .......................... 404774

(51) Int. Cl.
*B65D 39/02* (2006.01)
*B65D 53/04* (2006.01)
*F16K 7/12* (2006.01)

(52) U.S. Cl.
CPC ............... *B65D 39/02* (2013.01); *B65D 53/04* (2013.01); *F16K 7/12* (2013.01); *B65D 2539/001* (2013.01)

(58) Field of Classification Search
CPC .............. F16K 7/00; F16K 7/12; B65D 39/00; B65D 39/02; B65D 53/04; B65D 53/00; B65D 2539/001; B65D 2539/006; B65D 2539/00; B65D 47/2081; B65D 51/1683; B65D 51/1644; B65D 51/1633; B65D 51/16; B65D 2543/00046; A61J 11/002; A47G 19/2272; A47G 19/2266; A47G 19/2216; Y10T 137/7895

(Continued)

(56) References Cited

U.S. PATENT DOCUMENTS 493,701 A * 3/1893 Gillette ................. B65D 39/02
215/298
1,437,572 A * 12/1922 Vons ...................... B65D 39/02
215/298

(Continued)

FOREIGN PATENT DOCUMENTS

EP    0516498       12/1992
FR    2202014 A1    5/1974

(Continued)

OTHER PUBLICATIONS

International Search Report for App. No. PCT/PL2014/000082 mailed Nov. 14, 2014.
Polish Search report mailed Aug. 2, 2013.

*Primary Examiner* — Kevin Murphy
*Assistant Examiner* — David Colon Morales
(74) *Attorney, Agent, or Firm* — Walker & Jocke

(57) ABSTRACT

A valve usable to repeatedly open and close a filling-emptying channel associated with a a beverage container includes a valve body (1). The valve body has a central ring (2) supported by arms (7). The ring includes a hole (4). The valve has a deformable valve plate (5) that includes an outer circumferential beveled edge (10). The valve plate further includes a central conical part (6) configured to engage in the hole. When in blocking relation of the channel, the conical part is engaged in the hole and the valve plate has a convex (Continued)

cup shape. Pulling outwardly on the valve body, changes the convexity of the valve plate and enables it to be disengaged from the valve body.

9 Claims, 6 Drawing Sheets

(58) Field of Classification Search
USPC ....... 251/331, 334, 348, 347, 341; 215/11.4; 220/203.18, 203.16, 203.12, 203.11, 220/203.01, 203.19, 714, 713, 711, 712, 715; 222/520–521, 496, 548
See application file for complete search history.

(56) References Cited

U.S. PATENT DOCUMENTS

| | | | | |
|---|---|---|---|---|
| 2,662,656 A | * | 12/1953 | Beaubaire | B65D 39/02 215/270 |
| 2,687,228 A | | 8/1954 | Knocke | |
| 3,026,909 A | * | 3/1962 | Boteler | F16J 3/02 251/331 |
| 3,659,625 A | * | 5/1972 | Coiner | F16J 3/02 137/204 |
| 4,003,489 A | | 1/1977 | Bingaman | |
| 4,135,513 A | * | 1/1979 | Arisland | A61J 11/002 137/494 |
| 4,423,824 A | * | 1/1984 | Varndell | A47K 1/14 215/256 |
| 4,473,167 A | * | 9/1984 | Bailey | B65D 17/166 220/254.3 |
| 4,537,387 A | * | 8/1985 | Danby | A61M 5/16881 137/510 |
| 4,747,511 A | * | 5/1988 | Dutt | B65D 17/506 220/254.1 |
| 6,766,915 B2 | * | 7/2004 | Wu | A61J 11/002 215/11.4 |
| 8,079,385 B2 | * | 12/2011 | Hatton | F16K 15/145 137/512.15 |
| 8,272,532 B2 | * | 9/2012 | Michaelian | A47G 19/2272 137/630.14 |
| 2007/0029353 A1 | | 2/2007 | Haechl et al. | |
| 2009/0140196 A1 | * | 6/2009 | Minegishi | B23K 20/02 251/331 |
| 2010/0126954 A1 | * | 5/2010 | Nilsson | B65D 47/36 215/40 |
| 2011/0290815 A1 | * | 12/2011 | Weld | B65D 21/0224 220/715 |

FOREIGN PATENT DOCUMENTS

| | | |
|---|---|---|
| GB | 1059574 | 2/1967 |
| GB | 2130565 A | 6/1984 |
| GB | 2448296 | 10/2008 |
| JP | 2004010109 | 1/2004 |
| PL | 198982 B1 | 9/2004 |
| WO | 2008154774 | 12/2008 |
| WO | 2013005181 A1 | 1/2013 |

* cited by examiner

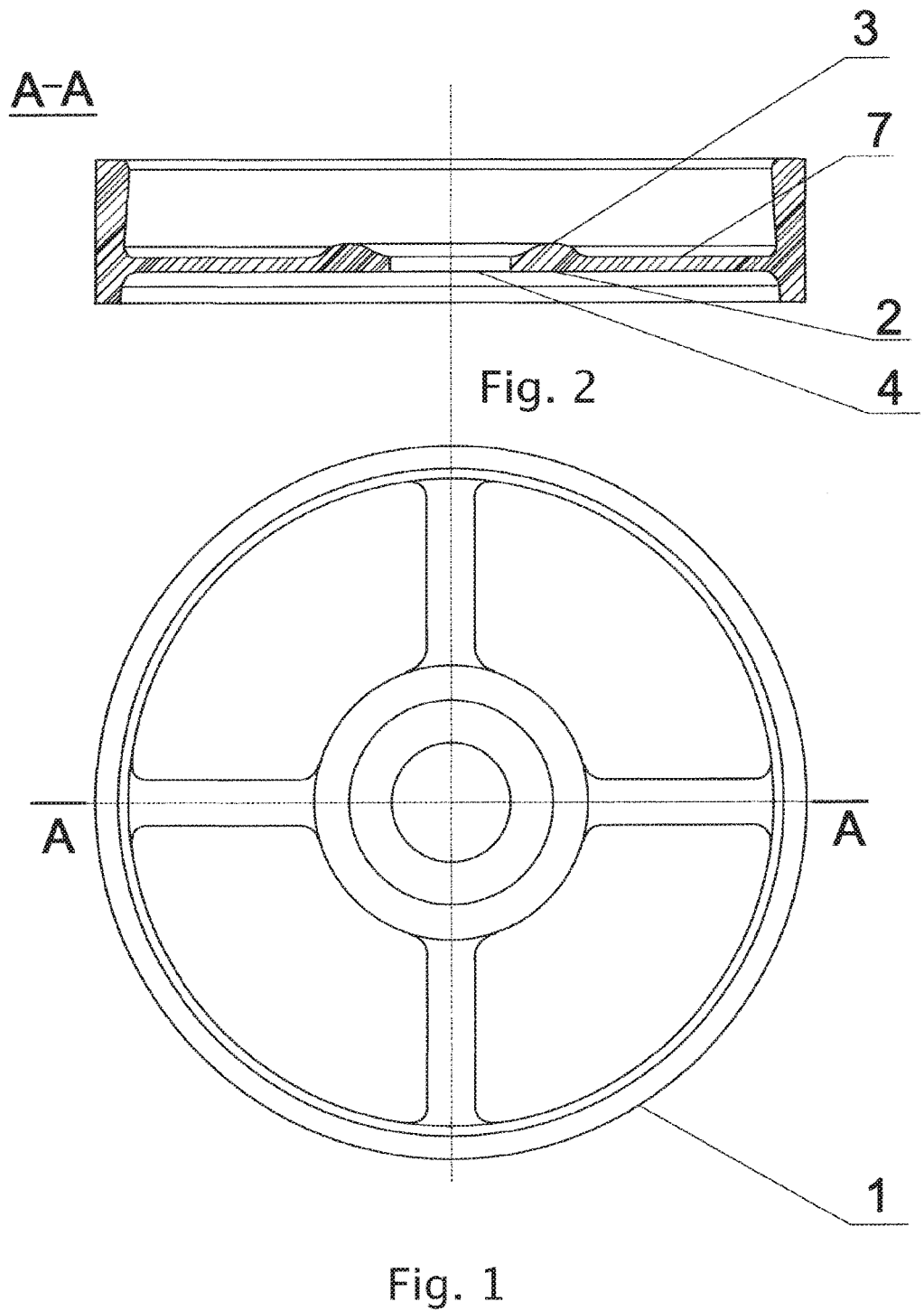

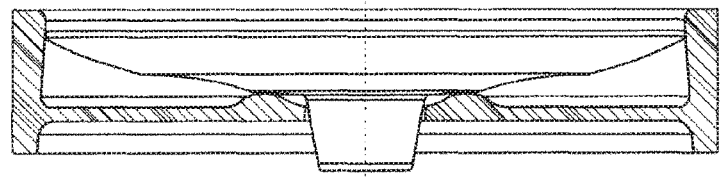
Fig. 7
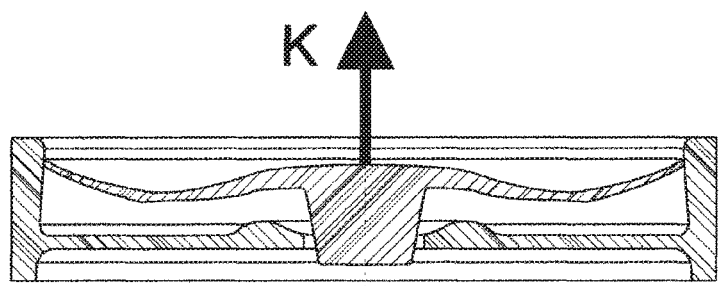
Fig. 8
Fig. 9
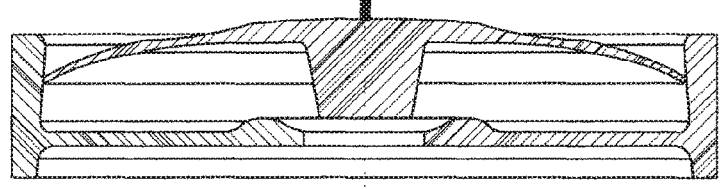
Fig. 10
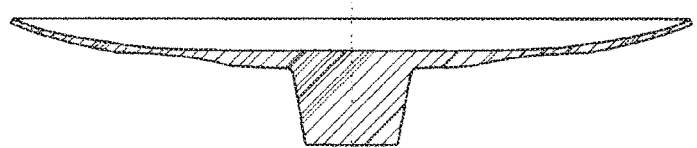
Fig. 11

CLOSURE WITH AN ELASTICALLY DEFORMABLE ELEMENT

TECHNICAL FIELD

This disclosure relates to a valve for controlling liquid flow through a filling-emptying channel which includes an elastically deformable element.

Exemplary embodiments relate to a valve made of thermoplastic material intended for multiple use in connection with a container such as a beverage can.

BACKGROUND

Can type containers made of specific light metal alloys are commonly used for holding liquids such as beverages. Such containers are produced through a series of complex and high energy-consuming processes such as high-temperature melting, molding, forming, profiling, cleaning, coating and double seaming of a can lid, which requires specialized multi-head equipment.

The production of such a can requires a number of separate and costly technological processes. Such a can is opened by a lever system, by moving a pre-incised weakened part of the top lid and pressing it inside the can.

Closures of containers for liquids such as beverages may be made of plastics. Generally, they comprise a cylindrical or similarly shaped container and a separate closure or lid of relatively elastic material.

Expandable closures of certain types may be placed loosely in a container opening and are then expanded until they contact the inner surface of the container opening walls. There are also elastically deformable closures for a cylindrical container in which a sealing flange extends conically, and its largest outer diameter is greater than the inner diameter of the container walls in the area of a container opening.

Existing closure structures are often not sufficiently resistant to pressure increase caused, for example, by heating the container, or for keeping the constant pressure of a carbonated beverage. Pressure increase may also result from dynamic liquid pressure caused by sudden movement of the container which exert increased pressure on its closure.

The drawbacks of metallic (aluminium) cans are excessive energy consumption in production, large amounts of generated toxic waste, the necessity of interoperational transport and complex recycling.

Beverages in aluminium cans often lose their taste, no 3D ads can be placed on the cans, it is impossible to close a can multiple times, and the drinking opening in the can is not ergonomic.

An alternative to metallic cans are containers made of thermoplastic materials sometimes resembling the metal cans, made in one single technological operation. Such cans are easy to recycle and are much more economic than the aluminium ones. However, such containers do not provide repeated quick closing and opening of such containers nor are such containers free from the drawbacks of the existing solutions.

Container closures may benefit from improvement.

SUMMARY

An exemplary embodiment includes a valve body with an elastically deformable element for controlling liquid flow through a filling-emptying channel of a container.

Exemplary embodiments of valve bodies described herein have numerous beneficial properties and uses.

BRIEF DESCRIPTION OF THE DRAWINGS

FIG. 1 is a top view of the exemplary valve in a filling-emptying channel.

FIG. 2 shows the valve body section in the filling-emptying channel along the line A-A in FIG. 1.

FIG. 7 shows the valve with the elastically deformable valve plate in the valve body.

FIGS. 8-11 show individual stages of opening the valve after applying external force K.

DETAILED DESCRIPTION

Figure 4:
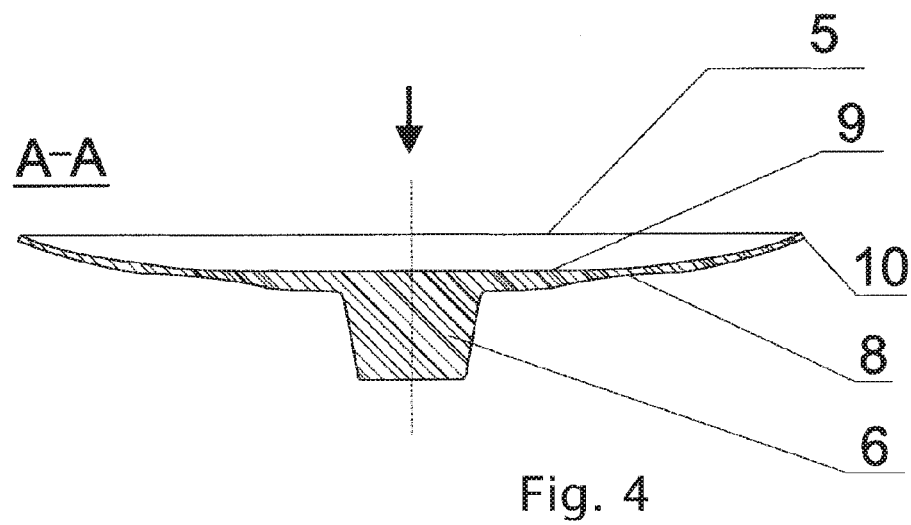
FIG. 4 is a section view of the elastically deformable valve plate along the line A-A in FIG. 3.
Figure 3:
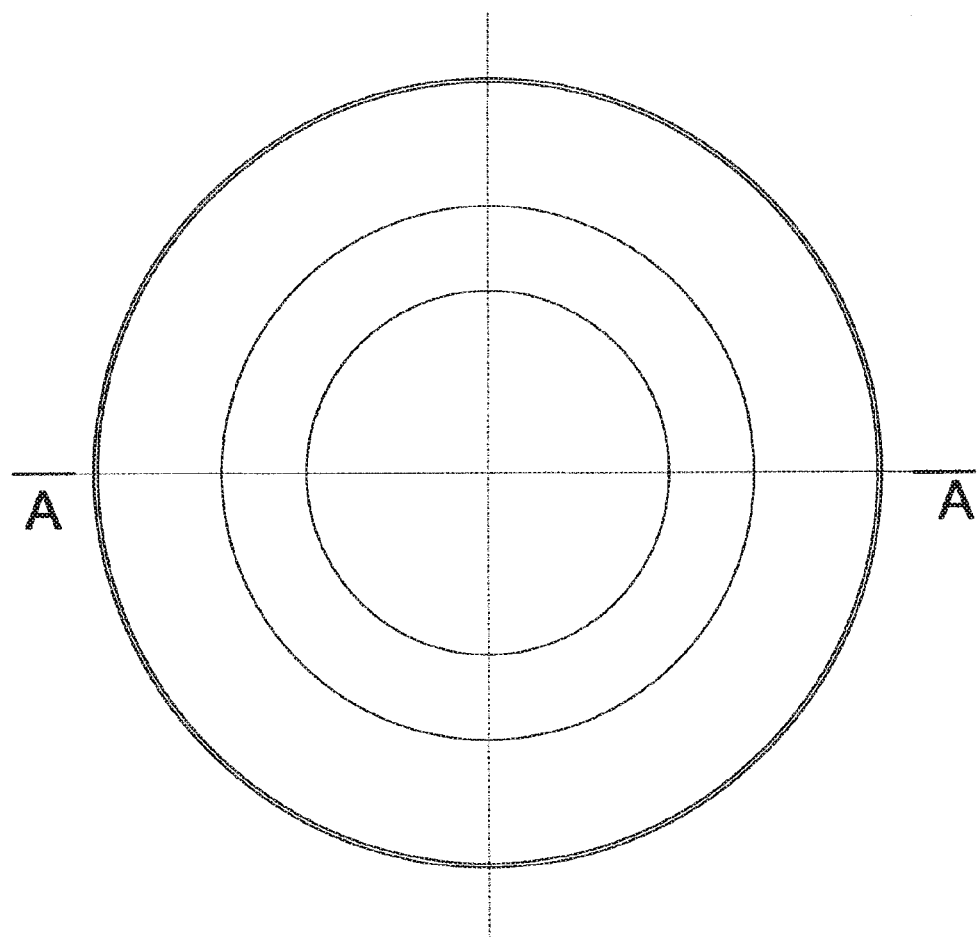
FIG. 3 is a top view of the elastically deformable valve plate.
Figure 6:
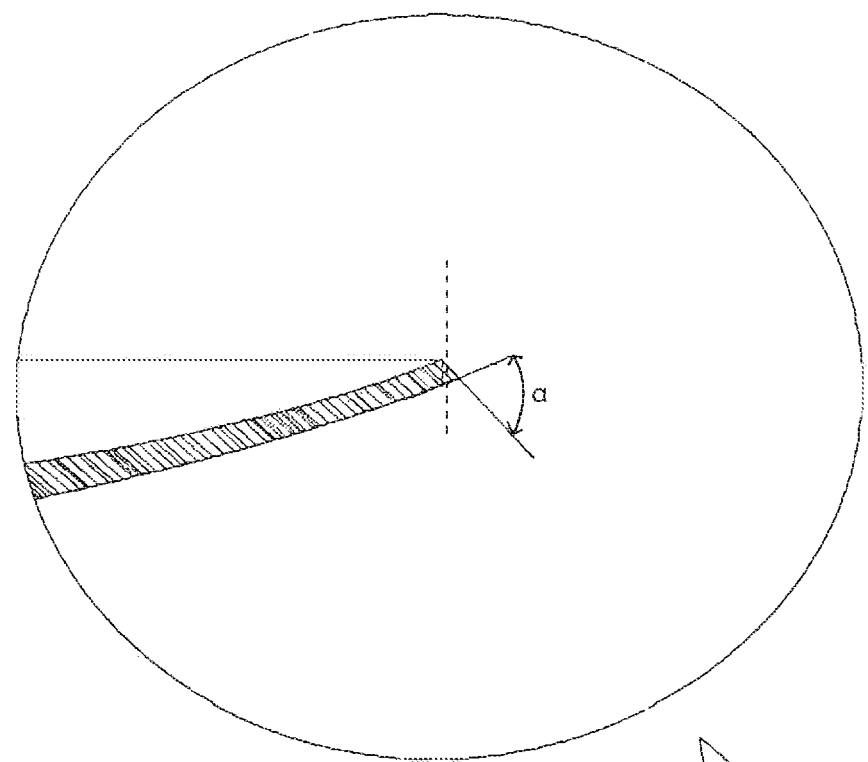
FIG. 6 shows enlarged detail A from FIG. 5.
Figure 5:
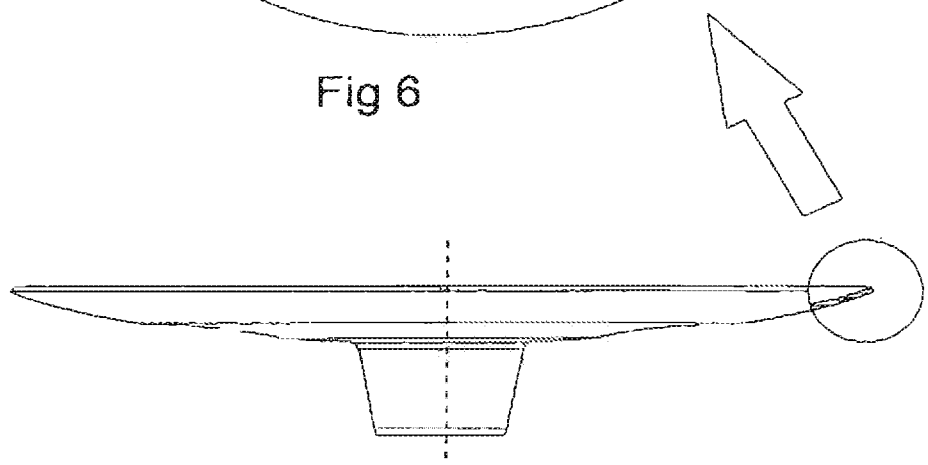
FIG. 5 shows the elastically deformable valve plate with marked detail A, showing the shape of its edge area.
Figure 12:
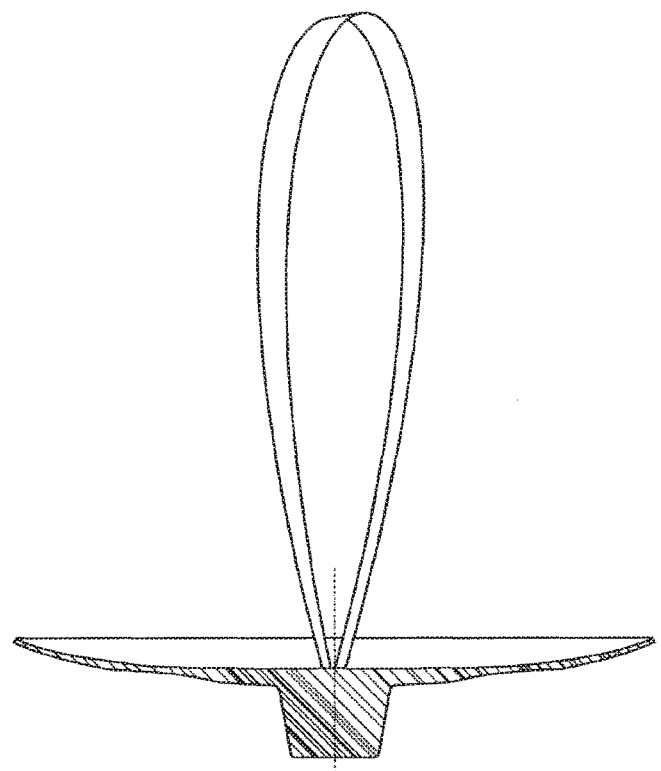
FIG. 12 shows the elastically deformable valve plate with a pull loop.
Figure 13:
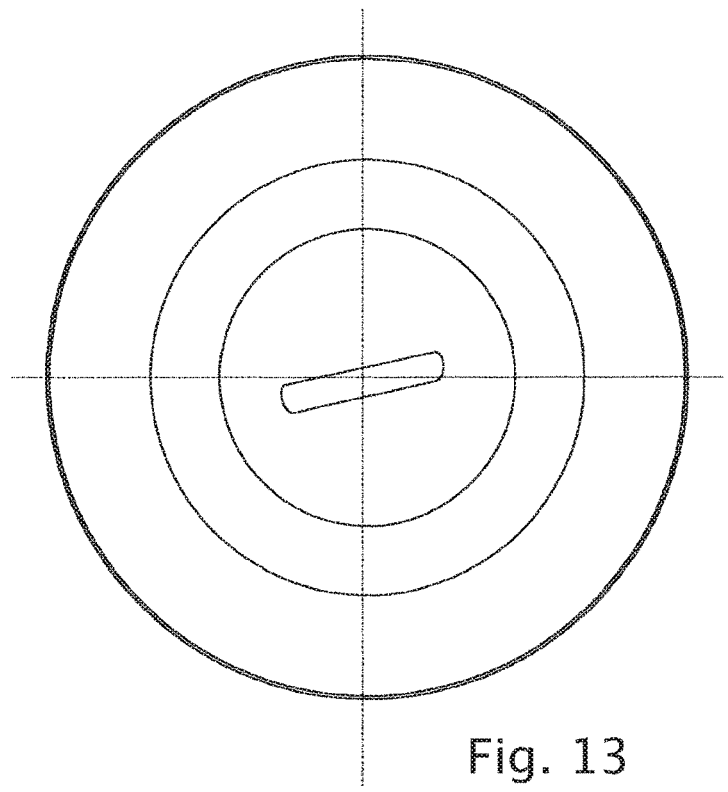
FIG. 13 is a top view of the elastically deformable valve plate with the pull loop.

Referring now to the drawings, there is shown an exemplary valve comprising a valve body 1 including a filling-emptying channel which is shown in FIGS. 1 and 2, and an elastically deformable valve plate 5 which is shown in FIGS. 3-6.

The valve body 1 includes the filling-emptying channel of a liquid holding container (not fully shown in the Figure). The valve body has an annular inner surface in the form of a truncated cone with a larger bottom diameter at a cone base. The cone base includes the largest inner diameter of the inner surface. At a level of the largest inner diameter are radially extending arms 7 which extend to a ring 2. The ring 2 includes a centrally located boss 3 and a hole 4. Hole 4 is sized for receiving the conical part 6 of an elastically deformable valve plate 5.

The ring 2 is mounted on the arms 7, which connect the ring to the inner surface of the valve body. The ring extends at a central axis in the filling-emptying channel.

The exemplary valve of the filling-emptying channel also comprises the elastically deformable valve plate 5. The outer diameter of the valve plate to a peripheral edge is greater than the largest inner diameter of the valve body 1 which bounds the filling-emptying channel. The valve plate diameter enables the valve plate to close the filling-emptying channel. The valve plate has the shape of a cup and is of variable thickness. The exemplary valve plate includes an area of outward circumferential narrowing 8 which enables reversing the convexity of the cup and shield 9. In the lower part, the valve plate has the axially centered inward extending conical part 6 for guiding by the ring 2 into engagement with the hole 4 in the valve body 1. The exemplary elastically deformable valve plate 5 has a bevelled edge 10, in the shape of a truncated cone with an inclination angle α, in cross section between the side plane of the cone and a tangent to an adjacent edge of the cup surface at the contact point of the cup and the cone shaped annular inner surface of the valve body 1.

An exemplary embodiment provides a closure for a container with the qualities of a valve in which an elastically deformable element, pressed into the recess of a valve body bounding a filling-emptying channel, offers increased elasticity and ensures closure tightness, which tightness increases with the difference between the inner pressure and the external pressure of the container.

An exemplary valve of the filling-emptying channel of a container with an elastically deformable element is characterised in that the valve body of the filling-emptying channel, placed in the container wall, has a ring with a centrally located boss. The ring includes an opening or hole configured to receive the conical part of the elastically deformable element in the form of a valve plate. The exemplary ring is mounted on at least two arms connecting it to the inner surface of the valve body of the filling-emptying channel. The exemplary elastically deformable valve plate for closing the filling-emptying channel is in the form of a cup of variable thickness with an outward area of circumferential narrowing which enables reversing the convexity of the cup and shield. In the exemplary embodiment the area of circumferential narrowing extends outward from a distance half of a radius from the central axis of the valve plate to the peripheral edge. In the lower (inward) part of the valve plate is the conical part configured for guiding into the hole of the ring in the valve body.

In an exemplary embodiments the filling-emptying channel can be located in numerous different locations on container bodies.

In an exemplary embodiment the valve body of the filling-emptying channel, at the contact point with the elastically deformable valve plate, has a surface that is machined by grinding or knurling.

In an exemplary embodiment the elastically deformable valve plate has a bevelled edge, in the shape of a truncated cone with an inclination angle $\alpha$, between the side plane of the cone and tangent to an adjacent edge of the cup surface at the contact point of the cup and the surface of the annular inner surface cone shape of the valve body. In exemplary embodiments, the inclination angle $\alpha$ is less than or equal to 90°.

In an exemplary embodiment the ring is located at the lower, inward part of the valve body at the level of the largest inner diameter.

In an exemplary embodiment the area of circumferential narrowing is located approximately in the middle of the radius of the cup of the valve plate.

In an exemplary embodiment the elastically deformable element in the form of a valve plate has a pull loop usable for pulling the valve plate outward for opening of the container.

In an exemplary embodiment the valve is located in the upper part of the container.

In an exemplary embodiment a longitudinal axis of valve body closure and a longitudinal axis of the container are apart from each other.

In an exemplary embodiment the filling-emptying channel, valve body, elastically deformable valve plate and the ring each have an annular circular cross section.

In an exemplary embodiment the filling-emptying channel, valve body, elastically deformable valve plate and the ring each have an annular oval cross section.

In an exemplary embodiment the valve body is an integral part of the filling-emptying channel or is seated in it.

An exemplary embodiment of the valve allows for multiple openings and closings of containers such as beverage cans without losing closure tightness.

Figure 14:
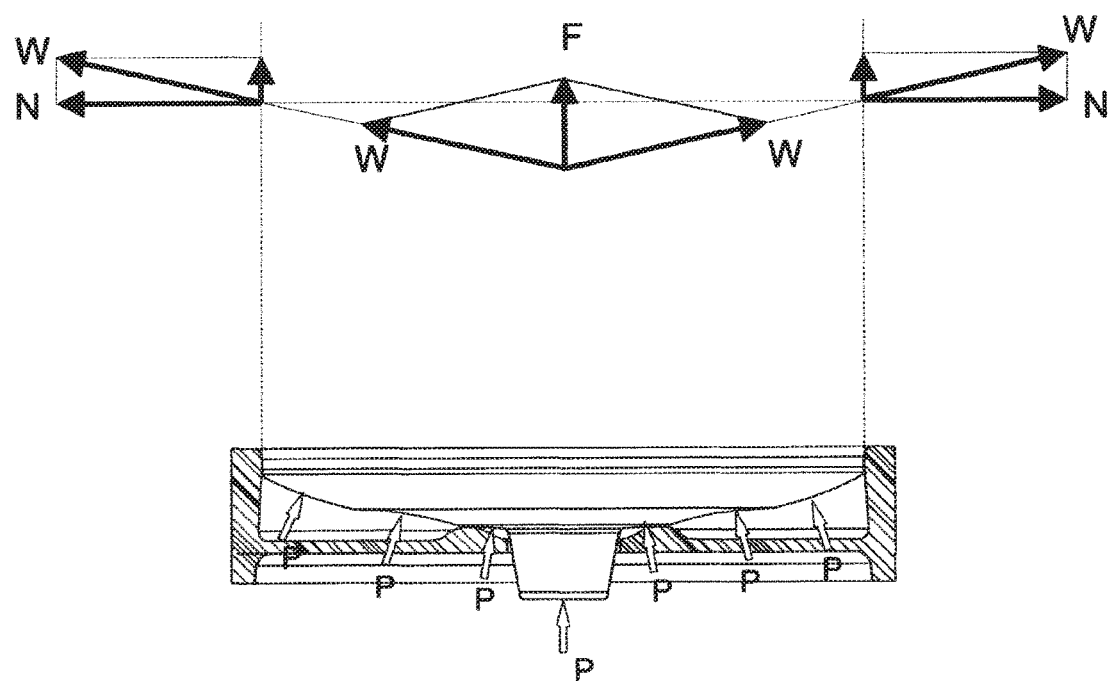
FIG. 14 shows a representation of distribution of forces acting on the valve plate.

Moreover, in an exemplary embodiment in the convex configuration of the cup, there is a relationship between the force resulting from the difference of the container internal and external pressures. As represented in FIG. 14, the pressure induced force on the cup of the valve plate acts against the annular side surface of the valve body. Thus increased internal container pressure increases the friction force between the side peripheral surface of the cup of the valve plate, and the abutting inner surface of the valve body. This relationship takes the form of a tangent $\alpha$ function, whereby the angle $\alpha$ is theoretically from 0 to 90°, and most likely from 40° to 75°. Additionally, due to the design and elasticity of the valve plate, the pressure force resisting outward movement of the cup comprising the valve plate increases with the increase of internal pressure.

The increasing pressure force, and the resultant increase of the friction force, at a constant friction coefficient, makes the closure of the exemplary container valve stronger.

Furthermore, with the closure design of an exemplary embodiment, the approach of other closures which includes moving the pre-incised portion of the lid into the container, and transfer of contaminants from the external surface of the lid into the container interior, is thereby avoided.

EXAMPLES

Exemplary embodiments of a closure utilizing the principals described herein are further illustrated by the following examples, which are set forth to illustrate the presently disclosed subject matter and are not to be construed as limiting.

Example 1

A container with a valve was made of polyethylene terephthalate in an injection moulding device as a cylindrical can with a height of 120 mm, diameter of 50 mm and wall thickness of 0.25 mm.

The valve body of the filling-emptying valve is formed as an integral part of the container, made in one production process together with the container. The valve body in the filling-emptying valve is 27 mm in diameter and is located in the upper lid. The external surface of the valve body is adjacent to the surface of the can cylinder. The valve body bounding the filling-emptying channel has a variable ID: the upper outward diameter is 22 mm, the lower inward one is 24 mm, and the valve body height is 14 mm.

Within the inward diameter of 24 mm, a central ring with a 5 mm hole is mounted on three radially extending arms. The arms have a rectangular cross section of 1.5 mm×3 mm. The elastically deformable element in the form of a valve plate, is made of the same material as that of the can. The outer diameter of the valve plate is 29 mm, and its total height is 9 mm.

The average thickness of the cup (valve plate) is 1 mm. The valve plate has a axially central cone at the bottom, as an integral part thereof. The cone has 5 mm upper outward diameter and the 3 mm lower inward diameter. A pull loop, into which a finger can be put and the cup pulled outward to open the can, is attached to the middle of the cup.

Example 2

A container with a valve was made of polyethylene terephthalate component in an injection moulding device as a rectangular can with a height of 150 mm and an octagonal base with rounded corners, with diameter of 80 mm and wall thickness of 0.3 mm.

The valve body of the filling-emptying valve has a diameter of 35 mm and is located close to the upper lid of the container on one of the rectangular side walls. The valve body in the filling-emptying channel has a variable ID: the smaller (outward) diameter is 24 mm, the larger (inward) one is 28 mm, and the valve body height is 14 mm.

In the valve body, within the diameter of 28 mm, is a ring with a 5 mm hole. The ring is mounted on four arms. The arms have a rectangular cross section of 2 mm×3 mm. The elastically deformable valve plate is made of the same material as the can. The outer diameter of the valve plate is 34 mm, and its total height is 10 mm.

The average thickness of the cup (valve plate) is 1.3 mm. The valve plate has a cone at the bottom, which is an integral part of the valve plate. The cone has 5 mm upper (outward) diameter and the 3 mm lower (inward) diameter. The cone has a cylindrical recess with a diameter of 2 mm and a depth of 8 mm. A pull loop, to which a finger can be put and the cup pulled outward to open the channel of the can is attached to the middle of the cup.

Example 3

A container was made of polyethylene terephthalate in an injection moulding device as a closed cylindrical can with a height of 130 mm, diameter of 60 mm and wall thickness of 0.25 mm.

While forming the can, a hole with a diameter of 27 mm is provided in the upper lid. A valve with the filling-emptying channel, made of the same material as the container, with the outer diameter of the valve body being 27 mm, having a flange with a diameter of 32 mm and located in the upper part of the valve body, is inserted into the hole.

The flange is used for positioning the valve body in the container hole and for permanent fixing by bonding or sealing of the valve body to the container. The valve body has an inner circular cross section and has a variable ID. The upper (outward) diameter is 22 mm, the lower (inward) diameter is 24 mm, and the valve body length is 14 mm. Within the diameter of 24 mm, a ring with a hole is mounted on six arms. The diameter of the ring is 5 mm. The arms have a rectangular cross section of 1.5 mm×3 mm. The valve has a flexible valve plate made of the same material as the can.

The valve plate has an outer diameter of 29 mm and a total height of 9 mm. The average thickness of the valve plate wall is 1 mm. The valve plate has a guiding and centring cone at the bottom, which forms an integral part of the plate. The diameter of the cone at its base adjacent the plate is 5 mm, and at the narrowed part (inward relative to the container), it is 3 mm. The cone is sized to extend in engaged relation with the hole in the ring.

Additionally, a pull loop in the form of a strip ended with a lateral boss is attached to the middle of the valve plate cup to allow pulling of the valve plate for quick opening of the filling-emptying channel.

Example 4

A container was made of polyethylene terephthalate in an injection moulding device as a closed cylindrical can with a height of 120 mm, diameter of 50 mm and wall thickness of 0.25 mm. The can is provided with a valve body in the filling-emptying channel with an outer diameter of 27 mm, located in the upper lid, whereby the external surface of the valve body is adjacent to the surface of the can cylinder.

The valve body in the filling-emptying channel has a variable ID: the smaller (outward) diameter is 24 mm, the larger (inward) one is 28 mm, and the valve body length is 14 mm. The inner surface is coarsely ground with abrasive material with a grain size of 80 from the middle of the valve body cylinder to the upper end. The grinding operation is intended to increase friction.

In the lower (inward) part of the valve body, a ring with a circular cross section thickness of 2 mm is mounted on two arms. The inner diameter of the ring is 5 mm. The arms have a rectangular cross section of 1.5 mm×3 mm. The valve has a valve plate made of the same material as the can. The valve plate has an outer diameter of 29 mm and a total height of 9 mm. The average thickness of the valve plate wall is 1 mm. The valve plate has a guiding and centering cone at the bottom, which is formed as an integral part of the valve plate. The diameter of the cone at its base adjacent the valve plate is 5 mm, and in the narrowed (inward) part, it is 3 mm. Additionally, a pull loop with a looped end, to which a finger can be inserted, is attached to the middle of the plate cup.

The exemplary valve provides for quick and multiple closings and openings of beverage containers, eliminates the drawbacks of the existing solutions, while keeping their advantages at the same time.

The exemplary valve is an independent or integral device that can be mounted at any point on the surface of the container.

With the present valve solution, it is possible to quickly open, close and fill or empty the container. The exemplary design of the valve body and of the valve plate interacting with the inner surface of the valve body ensures complete tightness.

The greater the difference between the internal end external container pressures, the greater the pressure of the sealing surface of the exemplary valve plate/cup acting on the inner surface of the valve body.

Quick removal of the valve plate from the valve body interior, and the resultant opening of the container, which involves disturbing the equilibrium of forces on the central part of the valve plate, reverses the convexity of the exemplary plate cup and allows for easy pulling out of the valve plate from the valve body.

In the case of the containers for carbonated beverages, such as beer, mineral water or energy drinks, the use of the solution according to an exemplary embodiment makes drinking of the liquid easier, with a higher hygienic standard than in closure solutions known from the prior art.

At the same time, it is possible to easily place (and replace) the valve plate inside the valve body, and thus tight and permanently closure of the container, which is a new and undeniably useful feature, not available in existing solutions.

The internal locating ring of the valve body, in addition to setting the valve plate position, has another function, which is the reduction of liquid splashing out of the container when the user moves with the opened container.

Another advantage is that when using a drinking straw, it is conveniently located in the hold in the ring of the valve body.

Of course these described embodiments are exemplary and alterations thereto are possible by those having skill in the relevant technology.

Thus the example embodiments and arrangements achieve improved capabilities, eliminate difficulties encountered in the use of prior articles and methods, and attain the desirable results described herein.

In the foregoing description, certain terms have been used for brevity, clarity and understanding. However, no unnecessary limitations are to be implied therefrom because such terms are used for descriptive purposes and are intended to be broadly construed.

Moreover the descriptions and illustrations herein are by way of examples and the embodiments not limited to the features shown and described.

Further, it should be understood that components, materials, features and/or relationships associated with one embodiment can be combined with components, materials, features and/or relationships from other embodiments. That is, various components, materials, features and/or relationships from various embodiments can be combined in further embodiments. The inventive scope of the disclosure is not limited to only the embodiments shown or described herein.

Having described the features, discoveries and principles of the exemplary embodiments, the manner in which they are made, utilized and carried out, and the advantages and useful results attained, the new and useful articles, arrangements, combinations, methodologies, structures, devices, elements, combinations, operations, processes and relationships are set forth in the appended claims.

The invention claimed is:

1. A valve configured for opening and closing a filling-emptying channel operatively connected to a liquid holding container, comprising: A) a valve body, including: i) an annular inner surface, wherein the annular inner surface bounds the filling-emptying channel, has a shape of a truncated cone with a base inward relative to the container, and wherein the annular inner surface includes a largest inner diameter, ii) a ring, wherein the ring includes a boss and a hole, wherein the boss and the hole are centrally located relative to the annular inner surface, and iii) at least two arms, wherein the at least two arms operatively connect the annular inner surface and the ring; and B) an elastically deformable valve plate, wherein the valve plate includes: i) an outer circumferential edge, wherein a plate diameter of the valve plate at the outer circumferential edge is greater than the largest inner diameter, ii) a centrally located inward extending conical part, configured to extend in deformed engaged relation in the hole, and iii) an area of circumferentially outwardly narrowed thickness; wherein in blocking relation of the filling-emptying channel, the conical part extends in the hole and the outer circumferential edge extends within and in engaged relation with the inner annular surface, whereby the valve plate has a convex cup shape, and wherein force applied outwardly on the valve plate is operative to cause the conical part to disengage from the hole and the area of circumferentially outwardly narrowed thickness to change convexity, whereby the valve plate is disengageable from the valve body to open the filling-emptying channel.

2. The apparatus according to claim 1 wherein the annular inner surface includes an annular point of contact at which the outer circumferential edge of the valve plate contacts the annular inner surface when the valve plate is in blocking relation of the filling-emptying channel, and wherein the point of contact is machined by grinding or knurling.

3. The valve according to claim 1 wherein the outer circumferential edge comprises a beveled edge having a shape of a further truncated cone, wherein in cross section the beveled edge has an inclination angle between the beveled edge and a tangent to an adjacent edge of the valve plate in the convex cup shape, at a contact point at which the beveled edge contacts the annular inner surface.

4. The valve according to claim 3 wherein the inclination angle is not greater than 90 degrees.

5. The valve according to claim 1 wherein the ring is positioned on the valve body at a level of the largest inner diameter.

6. The valve according to claim 1 wherein the valve plate between a central axis and the outer circumferential edge has a radius, and wherein the area of circumferentially outwardly narrowed thickness is located at half the radius.

7. The valve according to claim 1 and further comprising a handle operatively connected to the valve plate, wherein the valve plate is disengageable from the valve body through movement of the handle.

8. The valve according to claim 1 wherein the valve plate and the ring each have a circular cross section.

9. The valve according to claim 1 wherein the valve plate and the ring each have an oval cross section.

* * * * *